(12) United States Patent
Towles

(10) Patent No.: US 9,637,570 B2
(45) Date of Patent: May 2, 2017

(54) METHOD AND APPARATUS FOR REDUCING FOULING

(75) Inventor: Thomas W. Towles, Baton Rouge, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1059 days.

(21) Appl. No.: 12/483,057

(22) Filed: Jun. 11, 2009

(65) Prior Publication Data

US 2010/0317812 A1    Dec. 16, 2010

(51) Int. Cl.

| | |
|---|---|
| *C08F 2/00* | (2006.01) |
| *C08F 2/14* | (2006.01) |
| *C08F 4/24* | (2006.01) |
| *C08F 6/02* | (2006.01) |
| *C08F 10/00* | (2006.01) |
| *B01J 19/00* | (2006.01) |
| *B01J 19/18* | (2006.01) |
| *C08F 2/38* | (2006.01) |
| *C08F 110/02* | (2006.01) |

(52) U.S. Cl.
CPC ............ *C08F 10/00* (2013.01); *B01J 19/002* (2013.01); *B01J 19/1837* (2013.01); *C08F 6/02* (2013.01); *B01J 2219/00247* (2013.01); *C08F 110/02* (2013.01)

(58) Field of Classification Search
CPC ................. C08F 2/00; C08F 2/38; C08F 4/24
USPC .................................. 526/70, 74, 82–85, 106
See application file for complete search history.

(56) References Cited

U.S. PATENT DOCUMENTS

| | | | |
|---|---|---|---|
| 3,174,957 A * | 3/1965 | Hall ....................... | C08F 10/00 |
| | | | 524/333 |
| 3,177,184 A | 4/1965 | Cottle | |
| 3,269,997 A | 8/1966 | Lyons et al. | |
| 3,297,466 A * | 1/1967 | Herman et al. ............... | 427/212 |
| 3,708,465 A | 1/1973 | Dietrich et al. | |
| 4,211,863 A * | 7/1980 | McDaniel et al. ............. | 528/483 |

(Continued)

FOREIGN PATENT DOCUMENTS

| | | | |
|---|---|---|---|
| WO | WO 9214766 A1 * | 9/1992 | ............... C08F 2/00 |
| WO | WO 00/66637 | 11/2000 | |

OTHER PUBLICATIONS

McDaniel, M.P. et al. "Poisoning Studies on Cr/Silica," *J. Phys. Chem.*, 1991, vol. 95, pp. 3289-3293.

*Primary Examiner* — Fred M Teskin
*Assistant Examiner* — Elizabeth Eng
(74) *Attorney, Agent, or Firm* — Frank E. Reid; Kevin M. Faulkner; Leandro Arechederra, III

(57) ABSTRACT

Provided herein is a method for operating a slurry polymerization reaction system to reduce, inhibit, and/or prevent fouling in the polymer recovery and separation apparatus, including one or more portions of a high pressure flash tank. The method generally comprises polymerizing a monomer feed in a slurry polymerization reactor in the presence of catalyst and diluent to produce a polymerization effluent; continuously discharging at least a portion of said polymerization effluent from the reactor through a discharge valve; combining a catalyst poison stream with the polymerization effluent downstream of said discharge valve, wherein the catalyst poison stream comprises a catalyst poison that is a gas at standard conditions; and flashing the combination of polymerization effluent and catalyst poison stream in a first flash tank.

14 Claims, 3 Drawing Sheets

(56) References Cited

U.S. PATENT DOCUMENTS

| | | | |
|---|---|---|---|
| 4,306,044 A | | 12/1981 | Charsley |
| 4,326,048 A | | 4/1982 | Stevens et al. |
| 4,424,341 A | * | 1/1984 | Hanson et al. ............... 528/501 |
| 4,547,555 A | | 10/1985 | Cook et al. |
| 4,634,744 A | | 1/1987 | Hwang et al. |
| 4,834,947 A | * | 5/1989 | Cook et al. ................... 422/117 |
| 5,270,408 A | | 12/1993 | Craddock, III et al. |
| 5,331,086 A | | 7/1994 | Stricklen et al. |
| 5,336,738 A | * | 8/1994 | Havas et al. .................... 526/82 |
| 5,399,320 A | | 3/1995 | Craddock, III et al. |
| 5,543,479 A | | 8/1996 | Baade et al. |
| 6,201,076 B1 | | 3/2001 | Etherton et al. |
| 6,204,344 B1 | | 3/2001 | Kendrick et al. |
| 6,262,191 B1 | * | 7/2001 | Hottovy et al. ................. 526/64 |
| 6,281,300 B1 | * | 8/2001 | Kendrick ................ B01D 3/06 526/88 |
| 6,365,681 B1 | | 4/2002 | Hartley et al. |
| 6,559,247 B2 | | 5/2003 | Kufeld et al. |
| 6,689,846 B1 | * | 2/2004 | Leskinen et al. .............. 526/82 |
| 6,825,292 B2 | | 11/2004 | Reid |
| 6,838,531 B2 | | 1/2005 | Reid et al. |
| 6,936,666 B2 | | 8/2005 | Mihan et al. |
| 7,381,777 B1 | | 6/2008 | Towles et al. |
| 2004/0151642 A1 | | 8/2004 | Burns et al. |
| 2004/0230031 A1 | | 11/2004 | Hottovy et al. |
| 2004/0253151 A1 | | 12/2004 | Nguyen et al. |
| 2005/0034968 A1 | | 2/2005 | Reid et al. |
| 2006/0223958 A1 | * | 10/2006 | Fischbuch ............ C08F 110/02 526/68 |
| 2006/0287442 A1 | | 12/2006 | McElvain et al. |
| 2007/0036692 A1 | * | 2/2007 | Lewalle ....................... 422/131 |
| 2007/0197753 A1 | * | 8/2007 | Jiang et al. ................ 526/348.2 |

\* cited by examiner

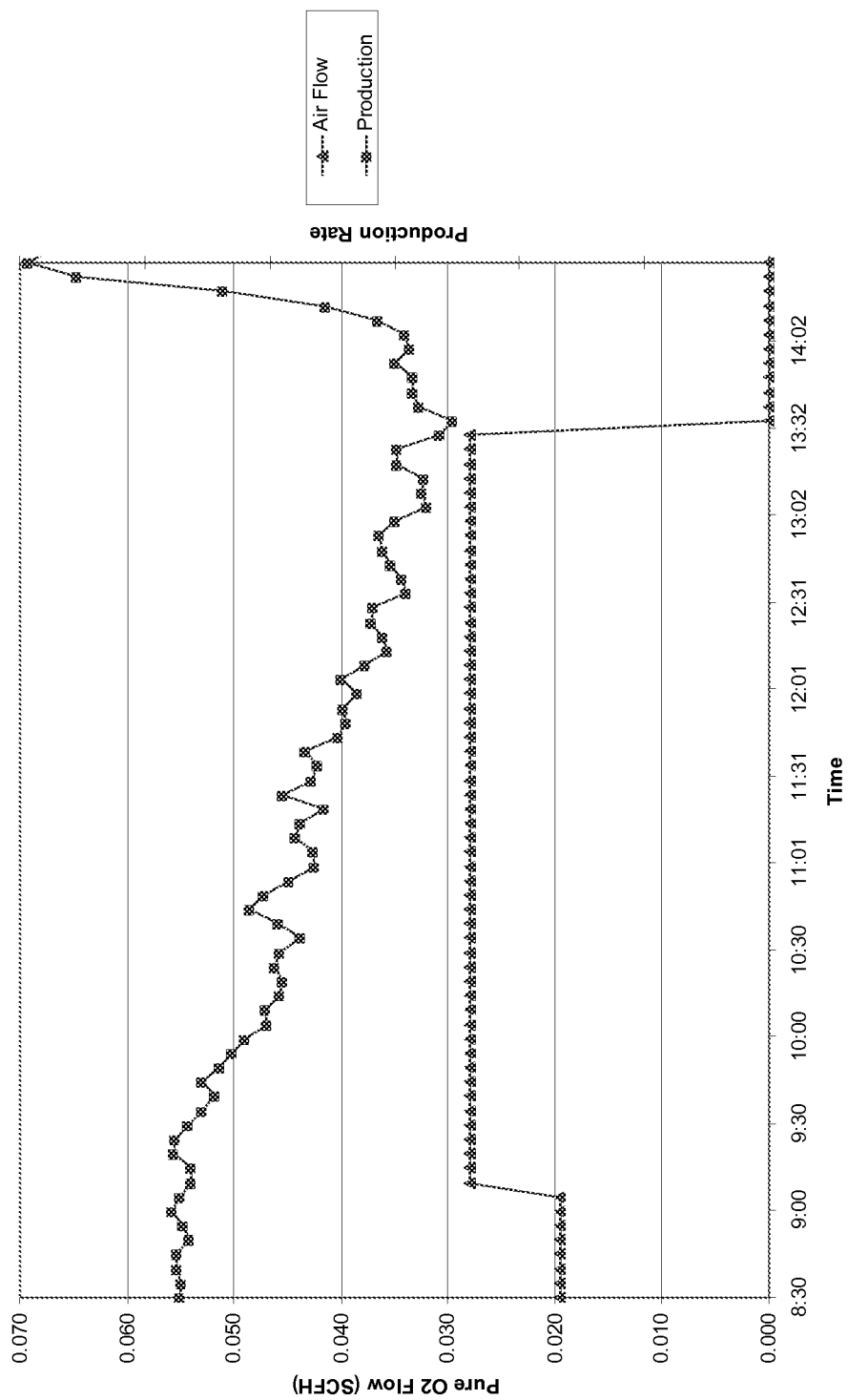

METHOD AND APPARATUS FOR REDUCING FOULING

FIELD OF THE INVENTION

This disclosure relates to a method and apparatus for reducing fouling in the polymer recovery and separation system of a slurry polymerization system. More particularly, fouling in the separation system is reduced by the introduction of a gaseous catalyst poison.

BACKGROUND OF THE INVENTION

Polyolefins, such as polyethylene, may be prepared by particle form polymerization, also referred to as slurry polymerization. In this technique, a monomer feed is polymerized in a reaction zone in the presence of a catalyst and a diluent to produce a polymerization effluent containing a slurry of polymer solids in the diluent. In order to recover the polymer from the slurry, the polymerization effluent is withdrawn from the reactor and the polymer solids are separated from the liquid diluent. Typical polymer recovery and separation systems include subjecting the polymerization effluent to a reduction in pressure so that the liquid diluent vaporizes leaving concentrated polymer solids. Often the reduction in pressure occurs in a first high pressure flash tank and a further reduction may occur in a second lower pressure flash tank. The vaporized diluent exits at a top portion of a flash tank, while the polymer remains solid and is recovered through a bottom portion of the flash tank. The vaporized diluent can then be recycled back to the reaction zone.

In addition to polymer solids and diluent, the polymerization effluent discharged from the reactor can also contain active catalyst and unreacted monomer. The high pressure and temperature conditions in the polymer recovery and separation system can be conducive to further polymerization. Further polymerization may then lead to polymer growth and fouling within the polymer recovery and separation system. The fouling may then lead to plugging of the polymer recovery and separation system in as little as a few hours and as long as several months, which may ultimately lead to stoppages in polyolefin production while the system is cleaned. Therefore, there is a need for a way to limit and/or prevent continued polymerization within the separation system, so as to reduce or eliminate fouling and plugging.

"Kill" systems and catalyst deactivating agents for olefin polymerization catalyst systems are known in the art. For example, U.S. Pat. No. 7,381,777 discloses methods for controlling fouling in the reaction zone of slurry-type olefin polymerization reactors by measuring a process operating parameter and by responding to said process operating parameter, e.g., by introducing a gaseous poison for the polymerization catalyst in response to a comparison between said measured parameter and a fouling parameter limit for said measured parameter. Such "kill" systems typically employ large amounts of catalyst poison and are intended to completely halt all polymerization within the reactor.

U.S. Pat. No. 4,211,863 discloses a method for deactivating catalyst residue in a polymer slurry. The catalyst residues of a transition metal compound and an organometallic compound contained in a polymer are deactivated by contacting the polymer with anhydrous carbon dioxide in a transfer line connecting the reaction zone with a zone of sufficiently lower pressure such that flashing of diluent occurs in the transfer line to assure mixing of the carbon dioxide and the catalyst residue. The flashing occurs in a low pressure flash chamber that operates at a pressure ranging from atmospheric pressure up to about 3 psig. Large amounts of carbon dioxide are needed to sufficiently deactivate the catalyst residue to inhibit the corrosivity, odor, and coloring of the final polymer product associated with the residual amounts of transition metal and organometallic catalysts.

Thus, there still remains a need for a way to control fouling outside of the reactor, particularly in the polymer recovery and separation system. The method should reduce or inhibit fouling and plugging in the polymer recovery and separation system, but should not diminish reactor production rates.

SUMMARY OF THE INVENTION

In one aspect, this disclosure relates to a process for producing polymer comprising: (a) polymerizing a monomer feed in a slurry polymerization reactor in the presence of catalyst and diluent to produce a polymerization effluent comprising a slurry of polymer solids in the diluent; (b) continuously discharging at least a portion of said polymerization effluent from the reactor through a discharge valve; (c) combining a catalyst poison stream with the polymerization effluent downstream of said discharge valve, wherein the catalyst poison stream comprises a catalyst poison that is a gas at standard conditions; and (d) flashing the combination of polymerization effluent and the catalyst poison stream in a first flash tank at a pressure greater than or equal to 0.17 MPa to produce a concentrated polymer effluent and a first gas stream comprising diluent and catalyst poison.

In one embodiment and in combination with the above disclosed aspect the process may further comprise cooling the first gas stream sufficiently to condense a majority of the diluent to form a liquid stream and an overhead poison stream, wherein the liquid stream comprises diluent and the overhead poison stream comprises catalyst poison, and wherein the liquid stream is recycled to the reactor without the need for further liquid separation and the overhead poison stream is removed from the process.

In another embodiment, and in combination with any of the above disclosed aspects or embodiments the process may further comprise: (e) discharging the concentrated polymer effluent from said first flash tank through a seal chamber; (f) combining the concentrated polymer effluent with a catalyst poison stream downstream of the seal chamber, wherein the catalyst poison stream comprises a catalyst poison that is a gas at standard conditions; and (g) flashing the combination of concentrated polymer effluent and the catalyst poison stream in a second flash tank at a pressure greater than or equal to 34.47 kPa to produce a second concentrated polymer effluent and a second gas stream comprising diluent and catalyst poison.

In one embodiment, and in combination with any of the above disclosed aspects or embodiments, the catalyst poison stream may be injected in one or more of a first transfer conduit leading from the discharge valve to the first flash tank, downstream of a heater on the first transfer conduit leading from the discharge valve to the first flash tank, in the first flash tank, a second transfer conduit leading from the second discharge valve to the second flash tank, downstream of a heater on the second transfer conduit leading from the second discharge valve to the second flash tank, and/or in the second flash tank.

In another aspect, this disclosure relates to an apparatus for producing a polymer comprising: (a) a polymerization reactor, having a discharge valve; (b) a first transfer conduit extending from the discharge valve of the polymerization reactor to a first flash tank, wherein the first transfer conduit has an injection point downstream of the discharge valve; and (c) a container suitable for storing a gaseous catalyst poison stream, wherein a conduit extending from the container to the injection point allows for the introduction of the gaseous catalyst poison stream to the first transfer conduit.

These and other features, aspects, and advantages of the present disclosure will become better understood with regard to the following description and appended claims.

BRIEF DESCRIPTION OF THE FIGURES

FIG. 3 shows the effect of the catalyst poison stream on the reactor production rates as described in Examples 2A and 2B.

DETAILED DESCRIPTION OF THE INVENTION

Figure 1:
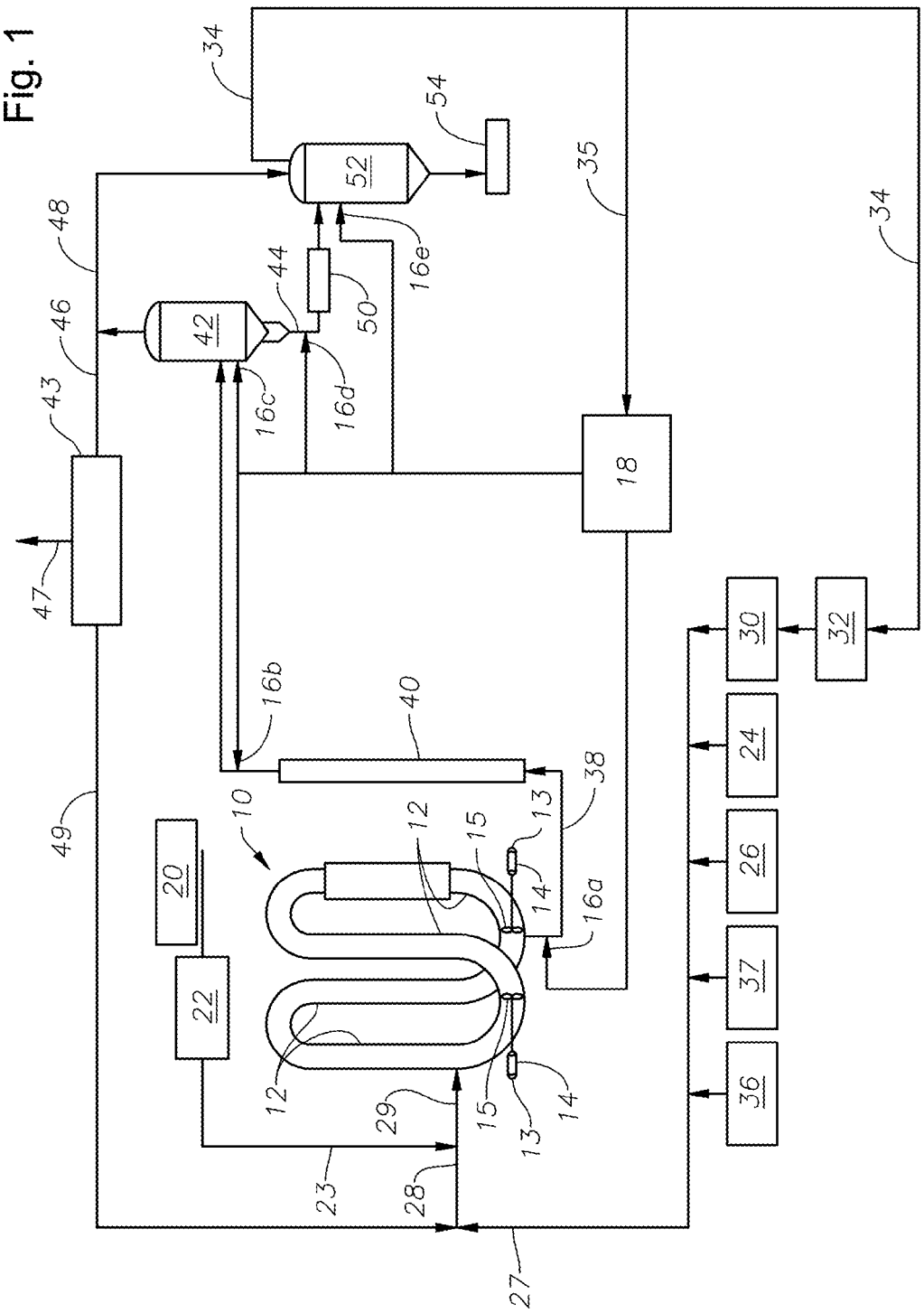
FIG. 1 is a schematic drawing of a 4-leg slurry loop reactor system with a two stage flash polymer recovery system along with optional catalyst poison stream injection points.

Various specific embodiments, versions, and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

All pressures listed herein are atmospheric pressures unless otherwise noted.

In slurry polymerization systems, the polymerization effluent withdrawn from the reactor generally comprises polymer solids and diluent. However, the polymerization effluent may also comprise active catalyst and unreacted monomer. As the polymerization effluent is withdrawn from the reactor, the polymer solids are separated from the remainder of the polymerization effluent in the polymer recovery and separation system. The polymer recovery and separation system may comprise one or more transfer conduits and one or more flash tanks. High pressure and temperature conditions within portions of the polymer recovery and separation system can be conducive to polymer growth, leading to fouling and plugging. Provided herein is a method for reducing or eliminating the fouling and plugging in the polymer recovery and separation system. The method generally comprises feeding a catalyst poison stream to the polymer recovery and separation system. In preferred embodiments, the catalyst poison stream is continuously fed to the polymer recovery and separation system, and the catalyst poison stream comprises a small amount of a gaseous catalyst poison.

Another benefit of the method described herein is that an effective method of reducing and/or inhibiting fouling and plugging within the polymer recovery and separation system may allow for higher heat input. For example, as fouling and/or plugging within the transfer conduits and flash tanks is reduced or inhibited, they may be heated to a higher degree, this can in turn increase polymer temperatures and therefore improve volatile purge effectiveness reducing polymer volatiles contained within the final polymer product.

Provided herein is a method for operating a slurry polymerization reaction system to reduce, inhibit, and/or prevent fouling in the polymer recovery and separation apparatus, including one or more portions of a high pressure flash tank. The method can comprise the steps of: (a) polymerizing a monomer feed in a slurry polymerization reactor in the presence of catalyst and diluent to produce a polymerization effluent comprising a slurry of polymer solids in the diluent; (b) continuously discharging at least a portion of said polymerization effluent from the reactor through a discharge valve; (c) combining a catalyst poison stream with the polymerization effluent downstream of said discharge valve, wherein the catalyst poison stream comprises a catalyst poison that is a gas at standard conditions; and (d) flashing the combination of polymerization effluent and catalyst poison stream in a first flash tank at a pressure greater than or equal to 25 psia (0.17 MPa) to produce a concentrated polymer effluent and a gas stream. The gas stream comprises diluent and catalyst poison, and in some embodiments may further comprise unreacted monomer.

In some embodiments, the method may optionally comprise the steps of: (e) discharging the concentrated polymer effluent from said first flash tank through a seal chamber; (f) combining the concentrated polymer effluent with a catalyst poison stream downstream of said seal chamber, wherein the catalyst poison stream comprises a catalyst poison that is a gas at standard conditions; and (g) flashing the combination of concentrated polymer effluent and the catalyst poison stream in a second flash tank at a pressure greater than or equal to 5 psia (34.47 KPa) to produce a second concentrated polymer effluent and a second gas stream. The second gas stream comprises diluent and catalyst poison, and in some embodiments may further comprise unreacted monomer.

The method may also further comprise cooling one or both of the first or second gas streams sufficiently to condense a majority of the diluent to form a liquid stream and an overhead poison stream. The liquid stream comprises diluent, and in some embodiments may further comprise unreacted monomer. The overhead poison stream comprises catalyst poison. The liquid stream may then be recycled back to the reactor without the need for further liquid separation. The overhead poison stream is then removed, e.g., by venting, from the process.

The catalyst poison stream may be introduced to the polymer recovery and separation system on an intermittent, batch-wise, or continuous basis. In embodiments where the catalyst poison stream is introduced to the polymer recovery and separation system on a continuous basis, the gaseous catalyst poison within the stream may be provided on an intermittent, batch-wise, or continuous basis. In embodiments where the gaseous catalyst poison is provided intermittently or on a batch-wise basis within the continuous stream, the stream may continuously provide a carrier gas to the polymer recovery and separation system with the gaseous catalyst poison being provided only intermittently or on a batch-wise basis. In preferred embodiments, the catalyst poison stream and the gaseous catalyst poison contained within the stream are introduced to the polymer recovery and separation system on a continuous basis.

In preferred embodiments, small amounts of the catalyst poison stream are introduced to the polymer recovery and separation system on a continuous basis to suppress further polymerization reaction within the polymer recovery and separation system, thus reducing fouling and plugging. The catalyst poison stream may be introduced immediately downstream of at least one of the reactor's discharge valves, thus allowing the catalyst poison to achieve some degree of mixing with the polymerization effluent in the transfer conduit line leading from the reactor's discharge valve to the first flash tank.

The amount of catalyst poison stream introduced to the polymer recovery and separation system should be carefully controlled to prevent reactor poisoning. A portion of the catalyst poison may be flashed with diluent in the flash tank. The flashed catalyst poison is generally vented and removed from the reactor system; however, a portion may be condensed with diluent and recycled to the reactor. Therefore, the amount of catalyst poison introduced to the polymer recovery and separation system should be monitored and controlled to prevent excess catalyst poison from being recycled to the reactor where it may slow down or stop polymerization within the reactor.

It may be advantageous to use a gaseous catalyst poisons as opposed to a liquid catalyst poison. Liquid catalyst poisons may condense with the diluent and will thus be recycled to the reactor with the diluent unless the condensed liquid is subjected to further treatment to separate out the catalyst poison. Gaseous catalyst poisons are less likely to condense with the diluent than a liquid catalyst poison, and thus the condensed diluent generally does not need to be subjected to further separation treatments when a gaseous catalyst poison is used. The amount of gas condensed may also depend on the pressure and temperature in the polymer recovery and separation system. For example, at higher temperatures and lower pressures the gaseous catalyst poison is less likely to condense with the diluent. However, as some portion of the gaseous catalyst poison may potentially enter the reactor via the recycled diluent, a gas which does not permanently poison the catalyst is preferred. Thus, oxygen, which is generally a non-permanent poison, may be preferred as compared to carbon monoxide, which is a more permanent poison.

The slurry-type polymerization reactor can be any type of polymerization reactor in which a slurry is the polymerization medium. Such polymerization reactors can include, but are not limited to, slurry loop polymerization reactors, stirred slurry polymerization reactors, or the like, or combinations thereof. In a preferred embodiment, the slurry-type polymerization reactor is a slurry loop polymerization reactor, such as one described in U.S. Pat. No. 6,239,235, the entire disclosure of which is incorporated herein by reference. In one embodiment where the slurry-type polymerization reactor is a slurry loop polymerization reactor, the polymerization reactor can comprise at least 2 legs, for example from 2 legs to 16 legs, at least 4 legs, from 4 legs to 16 legs, from 4 legs to 12 legs, from 6 legs to 12 legs, from 6 legs to 10 legs, from 8 legs to 12 legs, or from 4 legs to 8 legs. In an alternate embodiment, the polymerization reactor comprises 8 legs.

The monomer feed is typically an ethylene-containing monomer feed. In a preferred embodiment, the monomer feed comprises a majority (greater than 50 wt %) of ethylene, preferably at least 70 wt % ethylene, at least 75 wt % ethylene, at least 80 wt % ethylene, at least 85 wt % ethylene, at least 90 wt % ethylene, or at least 95 wt % ethylene. In another preferred embodiment, the monomer feed is substantially olefinic in nature. As used herein with reference to a composition, the term "substantially" should be understood to mean at least 98%, preferably at least 99%, for example at least 99.5% or at least 99.9%, by weight, of the composition; in some embodiments, "substantially" can mean completely, or about 100% by weight. In one embodiment, the monomer feed comprises not more than 99.9 wt % ethylene, for example not more than 99.7 wt % ethylene, not more than 99.5 wt % ethylene, not more than 99.3 wt % ethylene, or not more than 99 wt % ethylene.

Optionally, the monomer feed additionally comprises a comonomer. Optional comonomers can include, but are not limited to, propylene, 1-butene, 1-pentene, 4-methyl-1-pentene, 1-hexene, 1-octene, 1-decene, and combinations thereof. In one embodiment, the optional comonomer comprises an alpha olefin, preferably propylene, 1-butene, 1-hexene, 1-octene, and/or 1-decene.

Slurry diluents useful in the slurry-type polymerization reactor are typically inert to (or at least relatively unreactive in) the polymerization reaction and are typically liquids under the reaction conditions present in the slurry-type polymerization reactor. Examples of such slurry diluents can include, but are not limited to, hydrocarbons such as propane, butane, isobutane, pentane, isopentane, neopentane, hexane, cyclohexane, and combinations thereof. In a preferred embodiment, isobutane is used as a diluent. Additional or alternate examples of slurry diluents useful in the slurry-type polymerization reactor (as well as their effect on maximum reactor operating temperature) can be found in Hogan et al., "Phillips Petroleum Company Loop Reactor Polyethylene Technology," *J. Appl. Polym. Sci.: Appl. Polym. Symp.*, 1981, v. 39, pp. 49-60. Slurry diluents are also preferably, at least in the context of the methods of the present invention, not good solvents for the (co)polymer product formed (i.e., under normal reaction conditions) in the slurry-type polymerization reactor, as salvation of the (co)polymer product in the slurry diluent can often precede or cause fouling.

Useful catalysts typically include those which are useful generally in slurry-type polymerization reactors, e.g. single site and/or multi-site catalysts relatively insoluble in the slurry diluent, such as metal oxide-based catalysts, Ziegler/Natta-type catalysts, metallocene catalysts, and combinations thereof. In some embodiments, a mixed system catalyst may be used, such as for example a catalyst comprising both a metallocene and a Ziegler/Natta-type catalyst. In other embodiments, the catalyst may be bimetallic, such as for example a catalyst comprising a metallocene and a Ziegler/Natta-type catalyst on the same support. One example of a catalyst useful in the methods according to the invention is disclosed in U.S. Pat. No. 2,285,721, the disclosure of which is incorporated herein by reference. These catalysts typically comprise a catalyst metal. Examples of such catalyst metals can include, but are not limited to, those listed in Groups 4-6 and 8-10 of the Periodic Table of Elements such as titanium, zirconium, hafnium, vanadium, chromium, and the like, and combinations thereof. In one embodiment, the catalyst metal comprises chromium. In another embodiment, the catalyst is activated such that the activated catalyst comprises a chromium oxide-based catalyst. In some embodiments, the catalyst comprises chromium on a silica-based support. In further embodiments, the chromium catalyst has been modified with titanium.

The rate of discharge of the polymerization effluent from the reactor is such as to allow a continuous process stream from the slurry loop reactor from the one or more points of discharge of the polymerization effluent through one or more continuous product discharge valves and also through a first flash tank and the associated vapor recovery and solids recovery systems. The rate of discharge of the polymerization effluent is such as to maintain a constant pressure in the slurry reactor and to eliminate intermittent high pressure pulses associated with a discharge of a portion of the reactor contents that occurs with settling legs on slurry reactors.

In some embodiments, the polymerization effluent may be heated during transit from a discharge valve to the first flash tank. The temperature to which the discharged polymerization effluent is heated during transit to the first flash tank for vaporization is below the fusion temperature of the polymer. This may be accomplished by appropriate heating of the transfer conduit leading from the discharge valve to the first flash tank. The quantity of heat supplied to the polymerization effluent during its transit through the transfer conduit to the first flash tank should preferably be at least equal to that quantity of heat which equals the heat of vaporization of that quantity of inert diluent which is to be flash vaporized in the first flash tank. This then will provide for the concentrated polymer solids formed in the first flash tank to be passed to the second flash tank to pass thereto at a higher solids temperature and thus facilitates the removal of residual diluent in the pores of such polymer solids by the operation of the second flash tank. That quantity of heat transferred to the polymerization effluent during its transit through the first transfer conduit to the first flash tank may even be greater, provided only that the quantity of heat so transferred will not cause the polymer solids therein to become heated to such a temperature at which they will tend to fuse or agglomerate one with another.

As the polymerization effluent is discharged from the reactor through a discharge valve, it travels through a first transfer conduit to a first flash tank. In some embodiments, the reactor may have more than one discharge valve with transfer conduits leading to one first flash tank, while in other embodiments the transfer conduits may lead to more than one first flash tanks. A catalyst poison stream is combined with the polymerization effluent downstream of a discharge valve. In embodiments, where there are multiple discharge valves, the catalyst poison stream may be combined with the polymerization effluent downstream of one discharge valve, or may be combined with the polymerization effluent downstream of more than one discharge valve. In one embodiment, the catalyst poison stream is combined with the polymerization effluent immediately after the effluent exits a discharge valve, in other embodiments the catalyst poison stream may be combined with the effluent at another location in a first transfer conduit. In further embodiments, the catalyst poison stream may be combined with the polymerization effluent in a first flash tank. In some embodiments, the catalyst poison stream may be combined with the polymerization effluent at more than one location, for example, it may be combined with the polymerization effluent immediately downstream of discharge valve and additional catalyst poison stream may be added directly to the first flash tank.

The catalyst poison stream comprises a gaseous catalyst poison. The catalyst poison should be in a gaseous state at: (1) the conditions (e.g., temperature, pressure, diluent content, and the like) in the (relevant portion(s) of) the polymer recovery and separation system; (2) standard conditions of temperature and pressure, which is defined herein as about 20° C. and about 100 kPa; or (3) both (1) & (2). In preferred embodiments, the catalyst poison stream comprises a catalyst poison that is a gas at standard conditions of temperature and pressure.

Examples of useful gaseous catalysts poisons include, but are not limited to, sulfur-containing poisons (e.g., hydrogen sulfide, mercaptans, and the like), oxygen-containing poisons (e.g., carbon monoxide, carbon dioxide, oxygen, and the like), nitrogen-containing poisons (e.g. amines, ammonia, and the like), halogen-containing poisons (e.g., chlorine-containing poisons such as chlorine, fluorine-containing poisons such as Freon®, and the like), hydrocarbon poisons (e.g., acetylene), and combinations thereof. Additionally or alternately, other useful gaseous poisons can include those disclosed in Hogan, "Catalysis of the Phillips Petroleum Company Polyethylene Process," Chap. 6 in *Applied Industrial Catalysis v.* 1, 1983, pp. 149-174. Useful catalyst poisons are generally polar and reactive. Examples of gaseous catalyst poisons include, but are not limited to, $O_2$, $O_3$, CO, $CO_2$, $NH_3$, SO, $SO_2$, $SO_3$, or mixtures thereof. In preferred embodiments, the gaseous catalyst poison is $O_2$.

Different catalyst poisons have different effects on the polymerization reaction and it may be desirable to use a catalyst poison which will temporarily suppress the reaction without permanently deactivating the catalyst. Without being bound by theory, it is believed that some catalyst poisons can impermanently react with the active site(s) on the slurry catalyst and/or with portions of the slurry catalyst that substantially block (e.g., sterically) the active site(s) on the slurry catalyst from catalyzing the polymerization reaction. Such impermanent reactions can include, but are not limited to, chemical complexation (e.g., delocalized charge-based interactions, such as pi-bond interactions, d-orbital interactions, or the like, or a combination thereof), chemical association (e.g., dipolar interaction, hydrogen-bonding, or the like, or a combination thereof), physical association (e.g., van der Waals interaction), or the like, or combinations thereof. Thus, in a preferred embodiment, the gaseous catalyst poison does not permanently deactivate the catalyst, but rather only acts to temporarily suppress the polymerization reaction. An example of a preferred gaseous catalyst poison which acts to temporarily suppress the polymerization reaction is $O_2$.

In one embodiment, the catalyst poison stream further comprises a non-gaseous carrier to carry the gaseous catalyst poison into the polymer recovery and separation system, which is typically inert to (or at least relatively unreactive with) the slurry catalyst. For instance, the gaseous catalyst poison can be at least partially dissolved in an inert liquid such as a slurry diluent. Examples of non-gaseous carriers can include, but are not limited to, slurry diluent, diluent different from that in the slurry, porous catalytic solid particles, porous non-catalytic solid particles, and the like, and combinations thereof.

In a preferred embodiment, the catalyst poison stream further comprises a carrier gas, which is typically inert to (or at least relatively unreactive with) the slurry catalyst. Examples of carrier gases can include, but are not limited to, nitrogen, argon, helium, methane, ethane, propane, and combinations thereof. In a preferred embodiment, the carrier gas is nitrogen.

The amount of carrier gas may greatly exceed the amount catalyst poison in the catalyst poison stream. For example, the catalyst poison stream may comprise a majority (at least 50 vol %) of carrier gas, or at least 60 vol %, or at least 75 vol %, or at least 80 vol %, or at least 90 vol %, or in some embodiments, at least 95 vol % carrier gas based on the total volume of the catalyst poison stream. In some embodiments, the catalyst poison stream comprises 51.0 to 99.9 vol % of carrier gas and 0.1 to 49.0 vol % of gaseous catalyst poison, or 60.0 to 99.5 vol % of carrier gas and 0.5 to 40.0 vol % of gaseous catalyst poison, or 70.0 to 99.0 vol % of carrier gas and 1.0 to 30.0 vol % of gaseous catalyst poison, or 80.0 to 98.5 vol % of carrier gas and 1.5 to 20.0 vol % of catalyst poison, 90.0 to 98.0 vol % of carrier gas and 2.0 to 10.0 vol % of catalyst poison.

In other embodiments, the catalyst poison stream may comprise at least 70 mol %, or at least 80 mol %, or at least 90 mol % of the carrier gas. In some embodiments, the catalyst poison stream may comprise 70.0 to 99.9 mol % of the carrier gas, or 80.0 to 99.5 mol %, or 90.0 to 98.5 mol % of the carrier gas.

The amount of catalyst poison introduced to the polymer recovery and separation system is an amount effective to reduce or prevent fouling. However, as small amounts of the catalyst poison may potentially be recycled back to the reactor, the amount of catalyst poison used should not be an amount such that it partially or completely deactivates the catalyst in the reactor thus reducing polymerization in the reactor. The exact amount of catalyst poison used may depend on the type (effectiveness) of the gaseous poison introduced in relation to the slurry catalyst and/or the proportion of gaseous catalyst poison introduced in comparison to carrier gas. Different catalysts have different sensitivities to catalyst poison, thus more or less catalyst poison may be needed to reduce fouling and plugging depending on the catalyst poison used and the catalyst used. For example, a chromium catalyst that has been modified by titanium, may tolerate a higher level of catalyst poison than one that has not been modified by titanium.

The amount of catalyst poison used should be such that it is below the "reactor poison" threshold. The "reactor poison" threshold is the level at which the reactor polymerization rate begins to substantially fall due to poison being recycled back to the reactor. Thus, the catalyst poison should be introduced to the polymer recovery and separation system in an amount less than the "reactor poison" level, yet an amount such as to achieve an adequate poisoning effect in the polymer recovery and separation system to minimize or eliminate plugging.

Additionally, catalyst poisons may also affect product quality, especially the melt index of the recovered polymer. For example, if too much catalyst poison is used, it may act to increase the melt index of the recovered polymer. Thus, the catalyst poison should be used in an amount such that it will not affect the melt index of the polymer or any other polymer property.

In one embodiment, the catalyst poison stream is combined with the polymerization effluent at a weight ratio of catalyst poison to polymer solid that is less than or equal to 0.1, or less than or equal to 0.05, or less than or equal to 0.01, or less than or equal to 0.005, or less than or equal to 0.0005, or less than or equal to 0.00005, or in some embodiments less than or equal to 0.000005. In some embodiments, the catalyst poison stream may be combine with the polymerization effluent at a weight ratio of catalyst poison to polymer solid that is in the range of $1\times10^{-20}$ to 0.1, or in the range of $1\times10^{-17}$ to 0.05, or in the range of $1\times10^{-15}$ to 0.01, or in the range of $1\times10^{-13}$ to 0.005, or in the range of $1\times10^{-12}$ to 0.0005, or in the range of $1\times10^{-11}$ to 0.00005, or in the range of $1\times10^{-10}$ to 0.000005.

In another embodiment, the catalyst poison stream is combined with the polymerization effluent at a weight ratio of catalyst poison to catalyst that is less than or equal to 0.5, or less than or equal to 0.3, or less than or equal to 0.1, or less than or equal to 0.05, or less than or equal to 0.01, or less than or equal to 0.005, or less than or equal to 0.0005. In some embodiments, the catalyst poison stream may be combined with the polymerization effluent at a weight ratio of catalyst poison to catalyst in the range of 0.5 to $1\times10^{-15}$, or in the range of 0.3 to $1\times10^{-13}$, or in the range of 0.1 to $1\times10^{-10}$, or in the range of 0.05 to $1\times10^{-8}$, or in the range of 0.01 to $1\times10^{-7}$, or in the range of 0.005 to $1\times10^{-6}$, or in the range of 0.005 to $1\times10^{-5}$.

In yet another embodiment, the catalyst comprises chromium and the catalyst poison stream is combined with the polymerization effluent at a weight ratio of catalyst poison to chromium that is less than or equal to 1, or less than or equal to 0.5, or less than or equal to 0.1, or less than or equal to 0.08, or less than or equal to 0.06, or less than or equal to 0.05. In some embodiments, the catalyst comprises chromium and the catalyst poison stream is combined with the polymerization effluent at a weight ratio of catalyst poison to chromium that is in the range of 0.00009 to 1, or in the range of 0.00005 to 0.5, or in the range of 0.0009 to 0.1, or in the range of 0.0005 to 0.08, or in the range of 0.0001 to 0.06, or in the range of 0.009 to 0.05.

In still another embodiment, the catalyst comprises chromium and the catalyst poison stream is combined with the polymerization effluent at a molar ratio of catalyst poison to chromium that is less than or equal to 1, or less than or equal to 0.7, or less than or equal to 0.5, or less than or equal to 0.1, or less than or equal to 0.07, or less than or equal to 0.05. In some embodiments, the catalyst comprises chromium and the catalyst poison stream is combined with the polymerization effluent at a molar ratio of catalyst poison to chromium that is in the range of 0.00009 to 1, or in the range of 0.0005 to 0.7, or in the range of 0.0009 to 0.5, or in the range of 0.0005 to 0.1, or in the range of 0.0001 to 0.07, or in the range of 0.009 to 0.05.

In some embodiments, the amount of catalyst poison introduced is in response to and can be varied due to one or more process operating parameters, such as the amount of catalyst flowing through the conduit. It is preferred that the process operating parameters be measured in situ (e.g., for the purpose of controlling the process operating parameters, preferably in real time, in order to reduce, inhibit, and/or prevent fouling therein), however, it is contemplated that process operating parameter measurements can be made ex situ and the data used to control the amount of catalyst poison introduced. In one embodiment, the measurement of one or more of the process operating parameters, the comparison of each of said process operating parameters to each fouling parameter limit, and the corresponding actions taken in response thereto, do not include use of a computer model/projection for setting either the normal process operating parameters/ranges or the fouling parameter limits.

The concentrated polymer solids/slurry are discharged from the first flash tank into a first flash tank exit seal chamber of such a length (l) and diameter (d) so as to provide a volume sufficient to maintain a volume of concentrated polymer solids/slurry sufficient to maintain a pressure seal in the exit seal chamber. The concentrated polymer solids/slurry are discharged from the exit seal chamber through an exit seal chamber reducer to a second transfer conduit which communicates the concentrated polymer solids/slurry as a plug flow to a second flash tank. The exit seal chamber reducer is defined by substantially straight sides inclined at an angle to that of horizontal equal to or greater than the angle of slide of the concentrated polymer solids/slurry.

The pressure for the first flash step will vary depending on the nature of the diluent and unreacted monomers and the temperature of the polymerization effluent. Typically, the pressure in the first flash tank is greater than or equal to 25 psia (0.17 MPa), or greater than or equal to 50 psia (0.34 MPa), or greater than or equal to 100 psia (0.69 MPa), or greater than or equal to 150 psia (1.03 MPa). In some embodiments, pressures in the range of from about 100 psia to about 400 psia (0.68 MPa to 2.76 MPa) can be employed, or in the range of 110 psia to 315 psia (0.76 MPa to 2.17 MPa), or more preferably in the range of from about 120 psia to about 270 psia (0.83 MPa to 1.86 MPa); or most preferably in the range of from about 130 psia to about 250 psia (0.90 MPa to 1.72 MPa), or in the range of 140 psia to 200 psia (0.96 MPa to 1.34 MPa).

The pressure within the first flash tank may be such as to allow the vaporization of from about 20 vol % to about 100 vol % of the diluent, or from about 30 vol % to about 100 vol %, or from about 30 vol % to about 90 vol % of the diluent.

The heat exchanging fluid used to condense the vapor from the first flash step is at a temperature in the range of from about 65° F. (18.3° C.) to about 135° F. (57.2° C.). A preferred embodiment uses a heat exchange fluid at a temperature of from about 75° F. (23.9° C.) to about 125° F. (51.7° C.). A most preferred embodiment uses a heat exchange fluid at a temperature of from about 85° F. (29.4° C.) to about 115° F. (46.1° C.).

The pressure for the second flash step may vary depending on the nature of the concentrated polymer effluent, e.g., the amount of diluent and unreacted monomers, and on the temperature of the concentrated polymer effluent. Typically, the pressure in the second flash tank is greater than 5 psia (34.47 kPa), or greater than 7 psia (48.26 kPa), or greater than 10 psia (68.95 kPa). In some embodiments, the pressure is in the range of 5 psia to 70 psia (34.47 kPa to 482.63 kPa), or in the range of 10 psia to 50 psia (68.95 kPa to 344.74 kPa), or in the range of 15 psia to 35 psia (103.42 kPa to 241.32 kPa).

The diluent vaporized in the first and second flash tanks can be collected, condensed, and recycled back to the reactor. An advantage of using a gaseous catalyst poison is that a majority of any gaseous poison that is flashed with the diluent in the first and second flash tanks, can resist condensation in the cooler of the recycle line which condenses the diluent for direct recycle. The gas is then able to be vented/passed out of the system through a light end/pressure control system, without being recycled back to the reactor. This is in contrast to the use of some liquid catalyst poisons which can condense with the diluent and are recycled back to the reactor unless the condensed diluent stream is treated to remove the catalyst poison.

It is believed that a majority of the gaseous catalyst poison that has been flashed with the diluent in the first and second flash tanks does not condense with the diluent and is vented from the polymerization system without being recycled back to the reactor.

Commercial production of ethylene-based (i.e., predominantly ethylene by weight) polymers in diluent (e.g. isobutane) had previously been limited to a maximum solids concentration in the reactor of 35-40 wt %. Indeed, concentrations of greater than 40 wt %, for example greater than 45 wt %, greater than 50 wt %, greater than 52 wt %, or even as high as 55 wt % or more, are believed to be possible with the reactors and methods described herein.

A non-limiting example of an apparatus used in the method for reducing fouling described herein will now be described with reference to FIGS. 1 and 2. In FIG. 1 there is shown a slurry loop polymerization reactor 10 having vertical segments or legs 12, as well as upper and lower horizontal segments (not labeled). The reactor can be cooled, e.g., by means of pipe heat exchangers. Each segment can be connected to the next segment by a smooth bend or elbow, thus providing a continuous flow path, typically substantially free from internal obstructions. The polymerization mixture can be circulated by means of impeller(s) 15 driven by circulating pump motor(s) 14 that have power 13 supplied thereto. Monomer, (optional) comonomer, chain terminating agent (if necessary), optional anti-static agent, activated catalyst, and diluent can be introduced via lines 24, 26, 36, 37, 23, and 30, respectively, which can enter the reactor individually or together via lines 27, 28, and 29, at one or a plurality of locations along the reaction zone. In order to form the activated catalyst, raw catalyst 20 can be treated in a catalyst activator 22 under conditions sufficient to activate the catalyst to an activity sufficient for polymerizing the monomer (and optional comonomer) feed(s).

A catalyst poison stream can be added at one or more points 16 downstream of a reactor discharge valve. The polymerization effluent withdrawn from the reactor passes through the first transfer conduit 38 into a high pressure flash chamber 42. Conduit 38 can optionally include a surrounding conduit 40, which can be provided with a heated fluid to indirectly heat the polymerization effluent in flash line conduit 38. In one embodiment, the catalyst poison stream is introduced immediately downstream of the discharge valve in the first transfer conduit 38 at injection point 16a. In another embodiment, the catalyst poison stream is introduced to the transfer conduit 38 at a injection point 16b downstream of the line heater 40. In a further embodiment, the catalyst poison stream may be introduced directly to the high pressure flash chamber 42 via injection point 16c.

Vaporized diluent, unreacted monomer, and catalyst poison can exit the flash chamber 42 for further processing, which can include recycle via conduit 46 to the reaction zone of reactor 10 or an optional subsequent product purification step (e.g., in low pressure flash chamber 52) via conduit 48. The vaporized diluent, unreacted monomer, and catalyst poison in conduit 46 may be condensed via a cooler/condenser 43. In the condenser, the vaporized diluent and a portion of unreacted monomer may be condensed for recycled back to the reactor via conduit 49. It is believed that a majority of the catalyst poison is not condensed in the condenser 43 and exits the system via conduit 47.

The concentrated polymer effluent can be withdrawn from high pressure flash chamber 42 for further processing using techniques known in the art. For instance, the high pressure flash chamber polymer product can be passed to low pressure flash chamber 52 via conduit 44, which, like conduit 38, can optionally include a surrounding conduit 50, which can be provided with a heated fluid to indirectly heat the high pressure flash polymer product passing therethrough. In some embodiments, additional catalyst poison stream may be introduced to conduit 44 via point 16d. In other embodiments, additional catalyst poison stream may be introduced via point 16e directly to the low pressure flash chamber 52. Again, as with high pressure flash chamber 42, vaporized diluent can exit low pressure flash chamber 52 for further processing, which can include recycle via conduit 34 to optional diluent purification system 32 and ultimately to the reaction zone of reactor 10 via lines 27, 28, and 29. In some embodiments, at least about 70 wt %, and in some cases at least about 90 wt %, of the slurry diluent can generally be recovered/recycled by using this two stage flash system.

If necessary, the polymer product obtained from the low pressure flash can be further subject to processing and finishing 54. Further finishing steps may include post-flash drying, e.g. by exposure to heat in a dryer; exposure to a relatively inert purge gas, such as nitrogen, in a purge vessel/column; combining the polymer product with liquid and/or dry additives; and/or processed the polymer product into pellets and/or an article, e.g. via an extruder.

Figure 2:
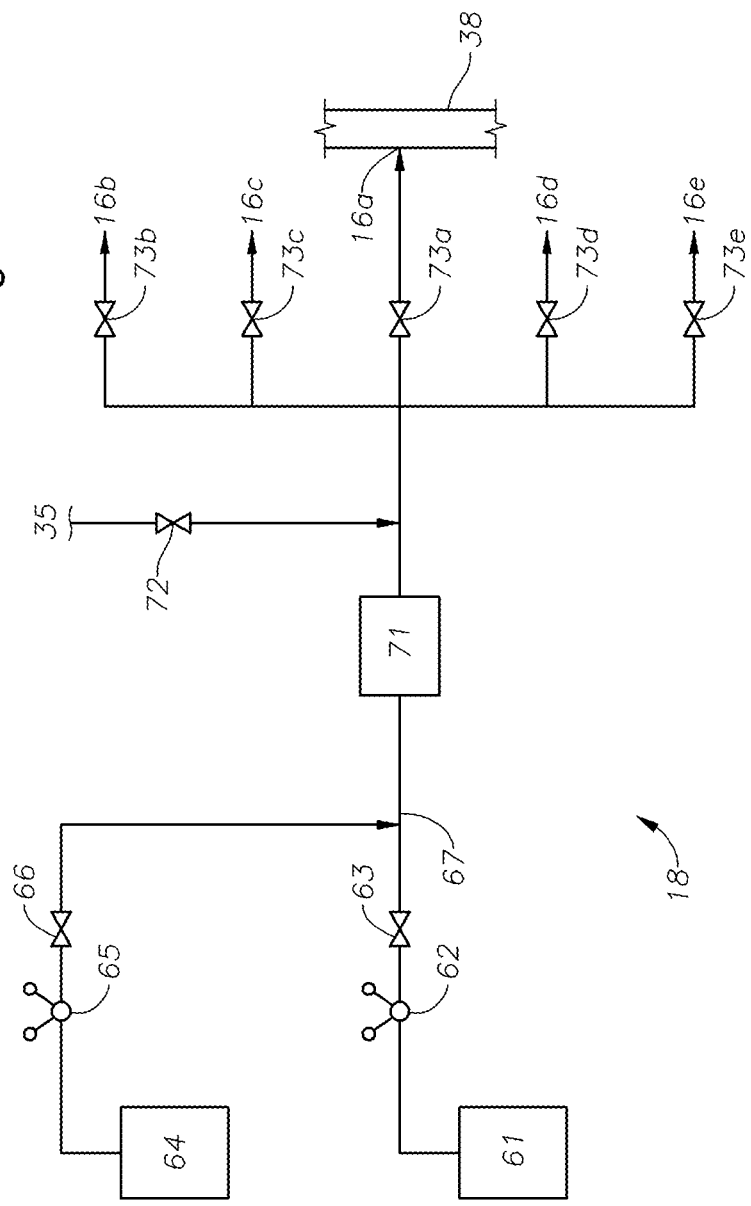
FIG. 2 is a schematic drawing of one embodiment of the catalyst poison stream delivery system.

Referring now to FIG. 2, an example of the catalyst poison delivery system 18 from FIG. 1 is shown. The catalyst poison delivery system 18 allows for the catalyst poison stream to be introduced to the polymer recovery and separation system at one or more points 16. The catalyst poison stream may be stored in one or more containers 61. The container 61 may have an optional external regulator 62. In some embodiments, container 61 is a compressed air cylinder.

In one embodiment, container 61 stores the catalyst poison stream in a pre-mixed form, that is, it stores a pre made mixture of gaseous catalyst poison and carrier gas. In such an embodiment, one or more containers 64 may also store additional catalyst poison stream. Container 64 may have an optional external regulator 65. Catalyst poison stream may then be fed through valves 63 and 66 from containers 61 and 64, respectively to conduit 67.

In an alternative embodiment, container 61 may store just the gaseous catalyst poison and container 64 stores the carrier gas. The gaseous catalyst poison from 61 may be fed through valve 63 and the carrier gas from 64 may be fed through valve 66 and mixed in line 67.

The catalyst poison stream in conduit 67 flows through a flow control device 71. In some embodiments, the flow control device 71 is a rotometer. The catalyst poison stream then flows through valve 73 to be introduced to the polymer recovery and separation system via one or more injection points 16. In FIG. 2 the catalyst poison stream flows through valve 73a to conduit 38 via point 16a. The catalyst poison stream may also flow through one or more of valves 73b, 73c, 73d, 73e to be introduced to the polymer recovery and separation system via injection points 16b, 16c, 16d, and 16e.

In some embodiments, the catalyst poison delivery system may be flushed with diluent, such as isobutane, from conduit 35 via valve 72.

The methods according to the present invention can reduce, inhibit, and/or prevent fouling within the polymer recovery and separation system. In one embodiment, the methods according to the invention can achieve a reduction in fouling of at least 25%, at least 50%, at least 60%, at least 70%, at least 75%, at least 80%, at least 85%, at least 90%, or at least 95%, as compared to the fouling that would occur in polymer recovery and separation systems operated without the methods of the present invention. The reduction in fouling can be measured by various benchmarks, e.g., the number of incidences of fouling per time period, the severity of fouling per incidence, or the like, or a combination thereof.

Additionally or alternately, the present invention can relate to the following list of embodiments:

Embodiment 1

A process for producing polymer comprising: (a) polymerizing a monomer feed in a slurry polymerization reactor in the presence of catalyst and diluent to produce a polymerization effluent comprising a slurry of polymer solids in the diluent; (b) continuously discharging at least a portion of said polymerization effluent from the reactor through a discharge valve; (c) combining a catalyst poison stream with the polymerization effluent downstream of said discharge valve, wherein the catalyst poison stream comprises a catalyst poison that is a gas at standard conditions; and (d) flashing the combination of polymerization effluent and the catalyst poison stream in a first flash tank at a pressure greater than or equal to 0.17 MPa to produce a concentrated polymer effluent and a first gas stream comprising diluent and catalyst poison.

Embodiment 2

The process of Embodiment 1, wherein the combination of polymerization effluent and the catalyst poison stream are flashed in the first flash tank at a pressure selected from greater than or equal to 0.17 MPa, greater than or equal to 0.34 MPa, greater than or equal to 0.69 MPa, greater than or equal to 1.03 MPa, in the range of 0.68 MPa to 2.76 MPa, in the range of 0.76 MPa to 2.17 MPa, in the range of 0.83 MPa to 1.86 MPa, in the range of 0.90 MPa to 1.72 MPa, or in the range of 0.96 MPa to 1.34 MPa.

Embodiment 3

The process of Embodiment 1 or 2, wherein the combination of polymerization effluent and the catalyst poison stream are flashed in the first flash tank at a pressure in the range of 0.96 MPa to 1.34 MPa.

Embodiment 4

The process of any one of Embodiments 1 to 3, wherein the combination of polymerization effluent and the catalyst poison stream are flashed in said first flash tank at a pressure greater than or equal to 0.17 MPa, or greater than 0.68 MPa to vaporize from about 30% to about 100% of the diluent.

Embodiment 5

The process of any one of Embodiments 1 to 4, wherein the catalyst poison stream is injected in one or more of a first transfer conduit leading from the discharge valve to the first flash tank, downstream of a heater on the first transfer conduit leading from the discharge valve to the first flash tank, or in the first flash tank.

Embodiment 6

The process of any one of Embodiments 1 to 5, further comprising: (e) discharging the concentrated polymer effluent from said first flash tank through a seal chamber; (f) combining the concentrated polymer effluent with a catalyst poison stream downstream of the seal chamber, wherein the catalyst poison stream comprises a catalyst poison that is a gas at standard conditions; and (g) flashing the combination of concentrated polymer effluent and the catalyst poison stream in a second flash tank at a pressure greater than or equal to 34.47 kPa to produce a second concentrated polymer effluent and a second gas stream comprising diluent and catalyst poison.

Embodiment 7

The process of Embodiment 6, wherein the combination of concentrated polymer effluent and the catalyst poison stream are flashed in the second flash tank at a pressure selected from greater than or equal to 48.26 kPa, greater than or equal to 68.95 kPa, in the range of 34.47 kPa to 482.63 kPa, in the range of 68.95 kPa to 344.74 kPa, or in the range of 103.42 kPa to 241.32 kPa.

Embodiment 8

The process of Embodiment 6 or 7, wherein the catalyst poison stream is injected in one or more of a second transfer conduit leading from the second discharge valve to the second flash tank, downstream of a heater on the second transfer conduit leading from the second discharge valve to the second flash tank, or in the second flash tank.

Embodiment 9

The process of any one of Embodiments 1 to 8, further comprising cooling one or both of the first or second gas streams sufficiently to condense a majority of the diluent to form a liquid stream and an overhead poison stream, wherein the liquid stream comprises diluent and the overhead poison stream comprises catalyst poison, and wherein the liquid stream is recycled to the reactor without the need for further liquid separation and the overhead poison stream is removed from the process.

Embodiment 10

The process of any one of Embodiments 1 to 9, wherein the catalyst poison stream is combined with the polymerization effluent at a weight ratio of catalyst poison to polymer solid that is less than or equal to 0.1.

Embodiment 11

The process of any one of Embodiments 1 to 10, wherein the catalyst poison stream is combined with the polymerization effluent at a weight ratio of catalyst poison to polymer solid in the range of $1 \times 10^{-20}$ to 0.1.

Embodiment 12

The process of any one of Embodiments 1 to 11, wherein the catalyst poison stream is combined with the polymerization effluent at a weight ratio of catalyst poison to catalyst that is less than or equal to 0.5.

Embodiment 13

The process of any one of Embodiments 1 to 12, wherein the catalyst poison stream is combined with the polymerization effluent at a weight ratio of catalyst poison to catalyst in the range of $1 \times 10^{-15}$ to 0.5.

Embodiment 14

The process of any one of Embodiments 1 to 13, wherein the catalyst comprises a metal selected from Groups 4-6 and 8-10 of the Periodic Table of Elements.

Embodiment 15

The process of any one of Embodiments 1 to 14, wherein the catalyst comprises chromium.

Embodiment 16

The process of Embodiment 15, wherein the catalyst poison stream is combined with the polymerization effluent at a weight ratio of catalyst poison to chromium in the range of 0.00009 to 1.

Embodiment 17

The process of any one of Embodiments 1 to 16, wherein the diluent is selected from propane, butane, isobutane, pentane, isopentane, neopentane, hexane, cyclohexane, and combinations thereof.

Embodiment 18

The process of any one of Embodiments 1 to 17, wherein the catalyst poison is selected from $O_2$, $O_3$, CO, $CO_2$, $NH_3$, SO, $SO_2$, $SO_3$, or mixtures thereof.

Embodiment 19

The process of any one of Embodiments 1 to 18, wherein the catalyst poison is selected from $O_2$, $O_3$, $NH_3$, SO, $SO_2$, $SO_3$, or mixtures thereof.

Embodiment 20

The process of any one of Embodiments 1 to 19, wherein the catalyst poison comprises $O_2$.

Embodiment 21

The process of any one of Embodiments 1 to 20, wherein the catalyst poison stream comprises a carrier gas.

Embodiment 22

The process of Embodiment 21, wherein the carrier gas comprises $N_2$.

Embodiment 23

The process of Embodiment 21 or 22, wherein the catalyst poison stream comprises at least 60 vol % carrier gas based on the total volume of the stream.

Embodiment 24

The process of any one of Embodiments 21 to 23, wherein the catalyst poison stream comprises 60.0 to 99.9 vol % carrier gas and 0.1 to 40.0 vol % catalyst poison.

Embodiment 25

The process of any one of Embodiments 1 to 24, wherein the catalyst poison stream consists essentially of $O_2$ and $N_2$.

Embodiment 26

An apparatus for producing a polymer comprising: (a) a polymerization reactor, having a discharge valve; (b) a first transfer conduit extending from the discharge valve of the polymerization reactor to a first flash tank, wherein the first transfer conduit has an injection point downstream of the discharge valve; and (c) a container suitable for storing a gaseous catalyst poison stream, wherein a conduit extending from the container to the injection point allows for the introduction of the gaseous catalyst poison stream to the first transfer conduit.

EXAMPLES

The method for reducing fouling and plugging within the polymer recovery and separation system will now be further described with reference to the following non-limiting examples.

A typical ethylene slurry polymerization process was conducted at a temperature of about 212° F. (100° C.) and a pressure of about 565 psia (3.90 MPa) in a slurry loop reactor. The polymerization effluent from the slurry loop reactor was continuously discharged through a valve into a transfer conduit leading to a first flash tank. A catalyst poison stream comprising $O_2$ and $N_2$ was combined with the polymerization effluent in the transfer conduit at the rates and ratios shown in Table 1. The polymerization effluent was then flashed in the first flash tank at a pressure of about 175 psia (1.21 MPa) and a temperature of about 160° F. (71.1° C.). The polymer slurry/solids discharged from the bottom of the first flash tank were communicated to a second flash tank where they were flashed at a temperature of about 150° F. (65.6° C.) and a pressure of about 25 psia (0.17 MPa). A high density polyethylene ("HDPE") product was then recovered from the second flash tank.

Examples 1 and 3 were polymerized using a silica supported chromium catalyst that was modified with titanium. Examples 2A and 2B were polymerized using a silica supported chromium catalyst. In Example 3 hydrogen was injected into the polymerization reactor.

Table 1 lists the catalyst poison stream feed rates for each example. The feed rates are shown as a function of the gaseous catalyst poison ($O_2$) in standard cubic feed per hour (SCFH). The feed rates are also shown as various ratios: (a) weight ratio of lbs. of gaseous catalyst poison ($O_2$) to lbs of polymer solids (HDPE), (b) weight ratio of lbs of gaseous catalyst poison ($O_2$) to lbs of catalyst; (c) weight ratio of lbs of gaseous catalyst poison ($O_2$) to lbs of chromium in the catalyst; and (d) molar ratio of moles of gaseous catalyst poison ($O_2$) to moles of chromium in the catalyst.

Table 2 lists polymer properties of the HDPE recovered in each example. The melt index ($I_2$) was measured in accordance with ASTM D 1238 (190° C., 2.16 kg) and the high load melt index ($I_{21}$) was measured in accordance with ASTM D 1238 (190° C., 21.6 kg). The wt % ash is the wt % of catalyst residue remaining in the recovered polymer, based on the weight of polymer.

TABLE 1

CATALYST POISON STREAM FEED RATES

| Example | Pure $O_2$ SCFH | Ratio of $O_2$ lbs./ HDPE lbs. | Ratio of $O_2$ lbs./ catalyst lbs. | Ratio of $O_2$ lbs./Cr lbs. | Ratio of moles $O_2$/moles Cr |
|---|---|---|---|---|---|
| 1 | 0.056 | $1.47 \times 10^{-7}$ | $4.19 \times 10^{-4}$ | $4.19 \times 10^{-2}$ | $6.82 \times 10^{-2}$ |
| 2A | 0.0196 | $5.14 \times 10^{-8}$ | $1.71 \times 10^{-4}$ | $1.71 \times 10^{-2}$ | $2.78 \times 10^{-2}$ |
| 2B | 0.028 | $7.13 \times 10^{-8}$ | $2.38 \times 10^{-4}$ | $2.38 \times 10^{-2}$ | $3.86 \times 10^{-2}$ |
| 3 | 0.028 | $8.05 \times 10^{-8}$ | $2.68 \times 10^{-4}$ | $2.68 \times 10^{-2}$ | $4.36 \times 10^{-2}$ |

TABLE 2

Properties of the Recovered Polymers

| Example | Density (g/cc) | $I_2$ | $I_{21}$ | wt % Ash |
|---|---|---|---|---|
| 1 | 0.953 | — | 6 | 0.035 |
| 2A | 0.948 | 0.2 | — | 0.03 |
| 2B | 0.948 | 0.2 | — | 0.03 |
| 3 | 0.953 | 0.3 | — | 0.03 |

In Example 2A, the catalyst poison stream was first introduced at a rate such that the $O_2$ introduced was 0.0196 SCFH. The rate was then increased to introduce 0.028 SCFH of $O_2$ in Example 2B. After increasing the rate of catalyst poison to the polymer recovery and separation system, the reactor production rate began to steadily decline as shown in FIG. 3. It is believed that at the higher catalyst poison feed rate in Example 2B, the catalyst poison began to be recycled back to the reactor in such an amount as to reduce the polymerization rate. The introduction of the catalyst poison stream was then discontinued and the reactor production rate began to increase again. As seen in FIG. 3 the reactor production rate oscillates and varies with changing conditions. The production rates after stopping the introduction of the catalyst poison stream increased to a level greater than that which was seen in Example 2A (i.e., when $O_2$ introduced was 0.0196 SCFH). It is believed that this is due to the shock the reactor system experienced when the introduction of the catalyst poison stream was discontinued which caused the reactor to become unsteady leading to great oscillations in the production rate.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:
1. A process for producing polymer comprising:
   a. polymerizing a monomer feed in a slurry polymerization reactor in the presence of a chromium oxide-based catalyst and diluent to produce a polymerization effluent comprising a slurry of polymer solids, unreacted monomer, and diluent;
   b. continuously discharging at least a portion of said polymerization effluent from the reactor through a discharge valve;

c. continuously combining a catalyst poison stream selected from the group consisting of $O_2$, $O_3$, CO, $CO_2$, $NH_3$, SO, $SO_2$, $SO_3$, or mixtures thereof with the polymerization effluent downstream of said discharge valve, wherein the catalyst poison stream comprises a catalyst poison that is a gas at standard conditions and has a molar ratio of catalyst poison to chromium that is less than 0.1, and wherein the catalyst poison stream comprises at least 70 mol % of a carrier gas;

d. flashing the combination of polymerization effluent and the catalyst poison stream in a first flash tank at a pressure greater than or equal to 0.17 MPa to produce a concentrated polymer effluent and a first gas stream comprising vaporized diluent, unreacted monomer, and catalyst poison; and e. condensing the vaporized diluent and unreacted monomer, and removing the catalyst poison from said condensed diluent and monomer as a gas by venting.

2. The process of claim 1, wherein the combination of polymerization effluent and the catalyst poison stream are flashed in the first flash tank at a pressure greater than or equal to 0.34 MPa.

3. The process of claim 1, wherein the catalyst poison stream is injected in one or more of a first transfer conduit leading from the discharge valve to the first flash tank, downstream of a heater on the first transfer conduit leading from the discharge valve to the first flash tank, or in the first flash tank.

4. The process of claim 1, further comprising recycling the condensed diluent to the reactor without the need for further liquid separation.

5. The process of claim 1, further comprising:

f. discharging the concentrated polymer effluent from said first flash tank through a seal chamber;

g. combining the concentrated polymer effluent with a catalyst poison stream downstream of the seal chamber, wherein the catalyst poison stream comprises a catalyst poison that is a gas at standard conditions; and h. flashing the combination of concentrated polymer effluent and the catalyst poison stream in a second flash tank at a pressure greater than or equal to 34.47 kPa to produce a second concentrated polymer effluent and a second gas stream comprising diluent and catalyst poison.

6. The process of claim 5, wherein the combination of concentrated polymer effluent and the catalyst poison stream are flashed in the second flash tank at a pressure greater than or equal to 48.26 kPa.

7. The process of claim 5, wherein the catalyst poison stream is injected in one or more of a second transfer conduit leading from a second discharge valve to the second flash tank, downstream of a heater on the second transfer conduit leading from the second discharge valve to the second flash tank, or in the second flash tank.

8. The process of claim 1, wherein the diluent is selected from propane, butane, isobutane, pentane, isopentane, neopentane, hexane, cyclohexane, and combinations thereof.

9. The process of claim 1, wherein the catalyst poison is $O_2$.

10. The process of claim 9, wherein the carrier gas comprises $N_2$.

11. The process of claim 1 wherein the catalyst poison stream consists essentially of $O_2$ and $N_2$.

12. The process of claim 1, wherein the amount of catalyst poison introduced is in response to an amount of polymer fouling within the first flash tank.

13. The process of claim 1, wherein the molar ratio of catalyst poison to chromium is less than or equal to 0.05.

14. The process of claim 1, wherein the molar ratio of catalyst poison to chromium is less than or equal to 0.01.

\* \* \* \* \*